C. M. GILLESPIE.
POWER UNIT FOR FARMING IMPLEMENTS
APPLICATION FILED JULY 26, 1917.

1,305,088.

Patented May 27, 1919.
4 SHEETS—SHEET 1.

Inventor
Chas. M. Gillespie.
By W. W. Boughton
Attorney

C. M. GILLESPIE.
POWER UNIT FOR FARMING IMPLEMENTS
APPLICATION FILED JULY 26, 1917.

1,305,088.

Patented May 27, 1919.
4 SHEETS—SHEET 2.

Inventor
Chas. M. Gillespie.
W.W. Boughton
Attorney

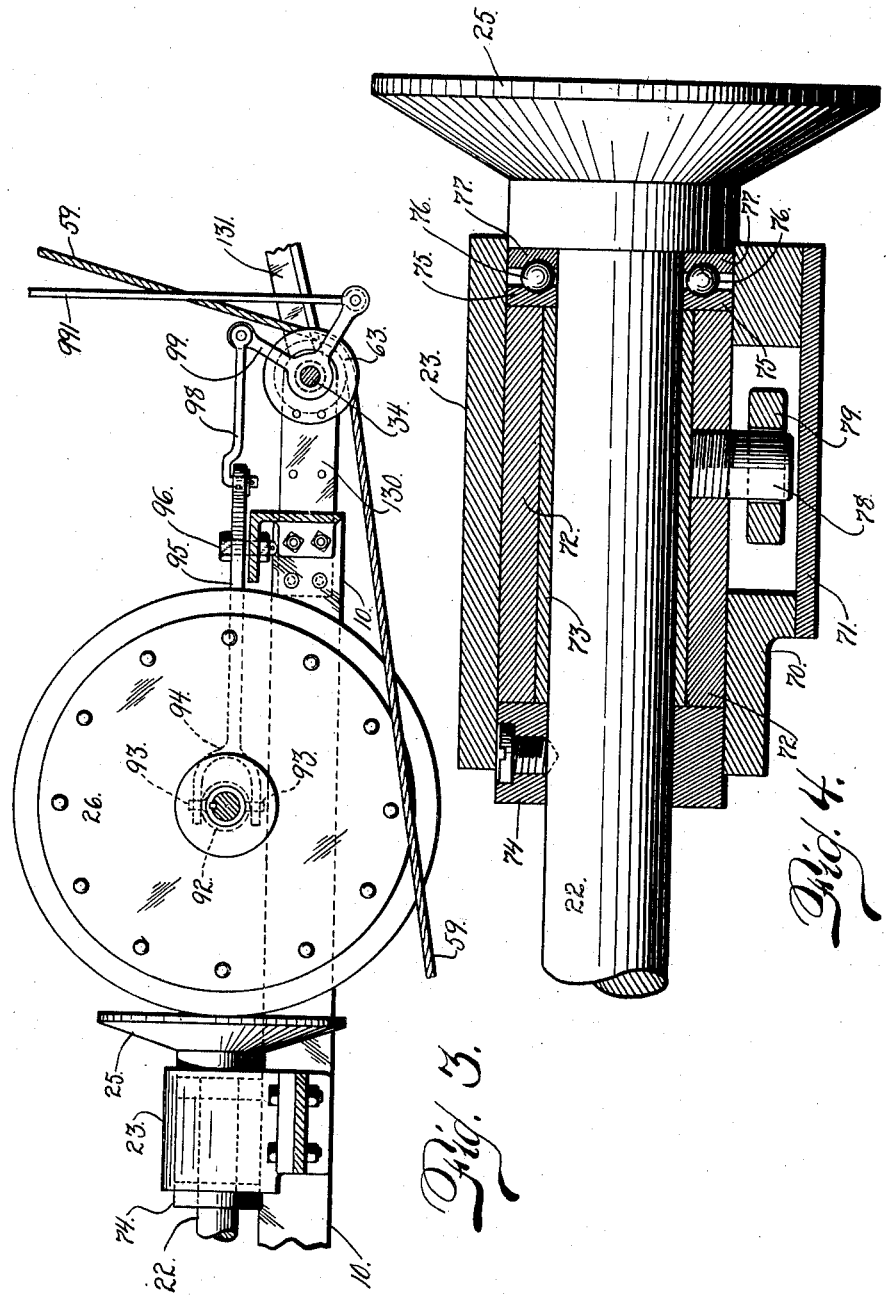

C. M. GILLESPIE.
POWER UNIT FOR FARMING IMPLEMENTS.
APPLICATION FILED JULY 26, 1917.
1,305,088.
Patented May 27, 1919.
4 SHEETS—SHEET 4.
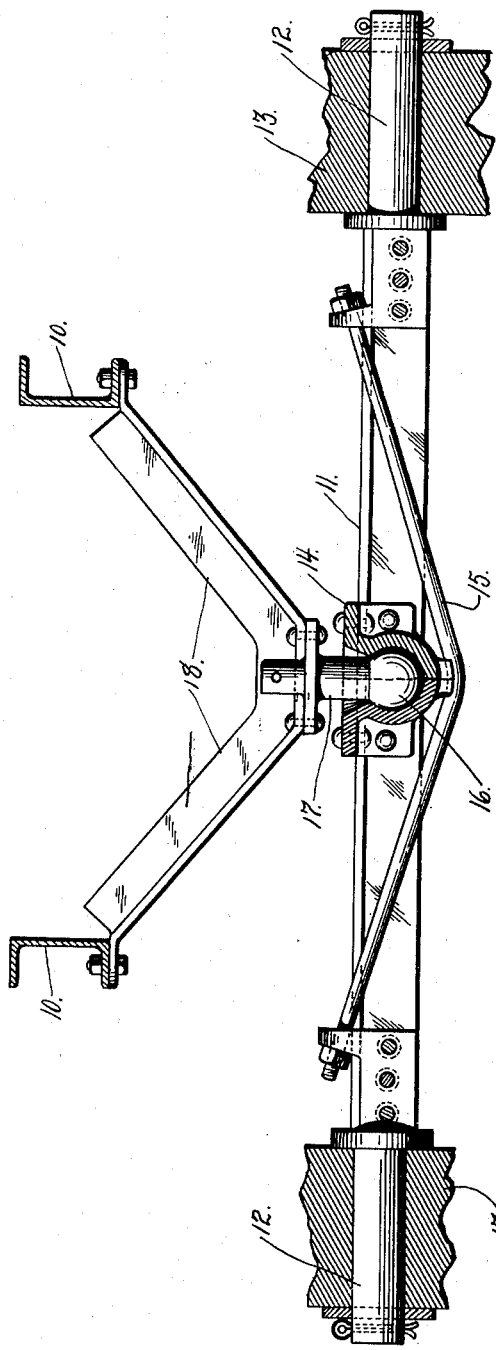
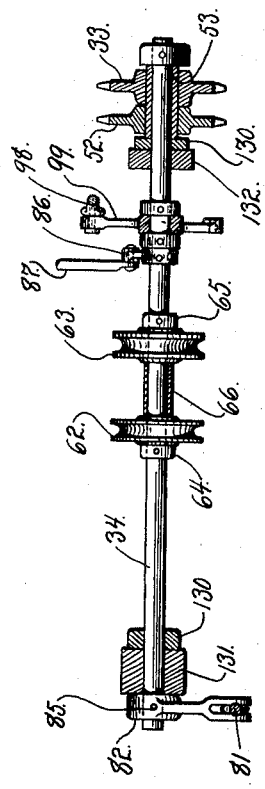
Inventor
Chas. M. Gillespie.
By W.W. Boughton
Attorney

UNITED STATES PATENT OFFICE.

CHARLES M. GILLESPIE, OF DENVER, COLORADO.

POWER UNIT FOR FARMING IMPLEMENTS.

1,305,088.  Specification of Letters Patent.  Patented May 27, 1919.

Application filed July 26, 1917. Serial No. 182,892.

*To all whom it may concern:*

Be it known that I, CHARLES M. GILLESPIE, a citizen of the United States, and a resident of Denver, in the county of Denver and State of Colorado, have invented a certain new and useful Improvement in Power Units for Farming Implements, of which the following is a full, clear, and exact description.

My invention is a power unit adapted to be employed with and to transmit power to a harvesting machine or other similar unit of the present customary types, the traction being supplied solely by the second unit and the power unit being propelled by the latter (generally more conveniently in advance by pushing). Heretofore, in attacking the problem of supplying motive power (particularly from internal combustion engines) to harvesting machinery and other farming implements, there have been two general courses followed out. The first of these plans contemplates mounting the power plant on the implement's own frame and an entire reorganization of the harvesting machinery portion of the device to correspond therewith. In every instance with which I am familiar this has resulted in a complicated, cumbersome and expensive combined machine such as has never found a place upon the market, one of the main causes for the failure of commercial success of these devices being that they are, as explained above, "special" throughout. The second approach to the problem has been by the means of providing tractors to draw already existing standard harvesting or other farming machinery. This solution, however, is open to serious objection in that it is very expensive in first cost and also usually requires an operator for the tractor and one for the harvesting machine. Furthermore, it requires that the tractor shall be built of sufficient weight so as to supply the requisite traction in itself resulting in economic loss due to the transportation of an unnecessary amount of dead load about the field where work was to be done. A single exception to the foregoing statement of the art with which I am familiar is the power mowing machine patented by Luther G. Walker on February 22, 1916, No. 1,172,326; and the present invention aims to so depart from the construction shown in that patent as to provide a construction of more general application, and, in particular, to provide a construction adapted for use not only with mowing machines but also more especially with binders.

The object of the present invention, therefore, is the provision of a movable power unit which shall be capable of being readily attached to various makes and types of harvesting machinery or other similar implements now on the market, and which shall be so designed that power may be transmitted therefrom to the traction wheels of the harvester, the power unit itself being in no sense a tractor but being propelled by the harvester which pushes the power unit in front of it. Thus there may be made a power unit of light weight but which is nevertheless provided with sufficient traction, through the weight of the harvesting machine, which it is to drive. A further object of this invention is the provision of a power unit of the character described which may be substantially balanced on its own transportation wheels and, therefore, will not tend to disturb the equilibrium of, or interfere with the operation of, a binder with which it may be desired to employ the unit. Another object of my invention is to so design the power unit that it may be attached to a binder in such a manner as not to interfere with the necessary vertical adjustment of the binder bed, and also with the necessary tilting of the same around an axis substantially in its middle. A further object of the invention is to provide a power plant of the character described which may be applied to various types of harvesting machinery with the provision of as few special attaching devices as may be. Further and more particular objects and advantages of my invention will later appear in this specification.

In the six sheets of drawings accompanying this application and forming a part hereof—

Fig. 3 is a detail in partial side elevation and partial vertical section on an enlarged scale of the transmission and the shaft or pintle which connects my device to a binder, the section on which this view is taken being indicated by the line 3—3 of Fig. 2;

Fig. 4 is a detail on an enlarged scale showing the friction disk in side elevation and the engine shaft bearing on a section taken on substantially the line 4—4 of Fig. 2;

Fig. 5 is a detail on an enlarged scale, partially in elevation and partially in vertical section, of the mounting of the power unit supporting truck, taken substantially on the line 5—5 of Fig. 1; and Fig. 6 is a detail in partial elevation and partial vertical section of the shaft for joining the power plant to a binder and its associated parts.

Figure 1:
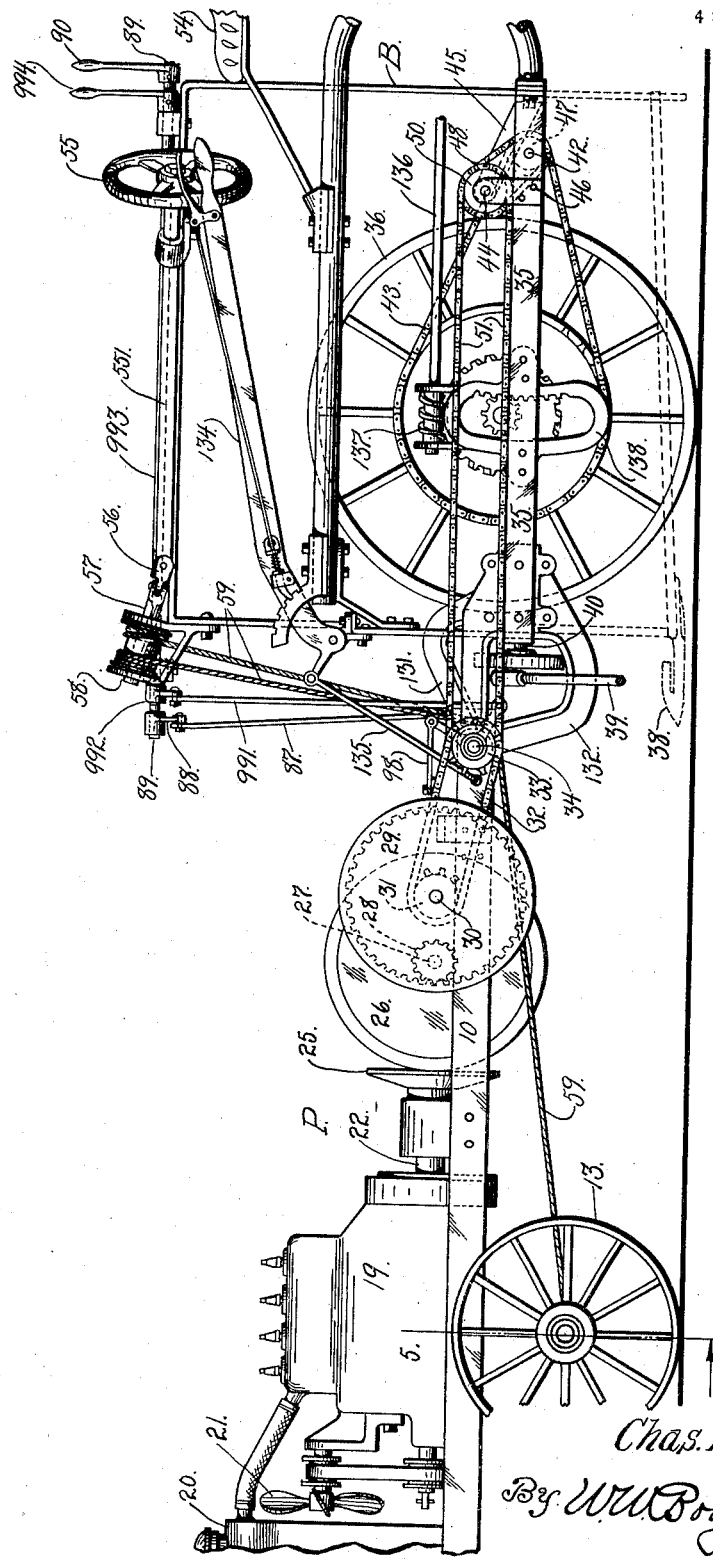
Figure 1 is a left hand side elevation of my invention as employed with a binder, a sufficient number of the operating parts of the binder being shown to clearly illustrate the attachment of my invention thereto and its use therewith.

Referring now to the drawings, I have employed the reference letter B to indicate a binder generally, and the letter P to designate my power unit and its transporting members. Referring first to the power unit it will be seen that it comprises a frame 10 of general rectangular configuration and formed preferably of channel iron. This frame is mounted for transportation on a single axle 11, preferably formed as shown of a pair of bent angle irons joined at their extremities to which are attached journals 12. Upon the journals 12, wheels 13 of any convenient construction are suitably mounted.

In order that the power unit shall be always substantially poised in all directions on its own truck and also to avoid submitting the frame of the power unit to twisting stresses and the transmission of these stresses to the harvesting machine frame, I prefer to mount the frame 10 on the axle 11 by means of a ball and socket joint, thus giving a one point universal suspension and permitting one wheel 13 to fall into a ditch or the like without straining the machine. This universal ball and socket joint is shown in detail in Fig. 5 and comprises a split socket 14 bolted through its flanges to the angle irons of 11 and supported by a truss rod 15. Within the spherical cavity of the socket 14 the ball 16 is received, the ball 16 being on the lower end of a vertical shaft 17, which is bolted to a V-shaped drop 18, which carries the frame 10.

As previously stated, it is desirable that the power unit shall be substantially balanced both longitudinally and transversely on the truck which rests on the wheels 13 and, therefore, for purposes of description, I will assume that the center of gravity of the frame 10 and the parts which it carries falls above the ball 16. As illustrated in the drawings, the power plant comprises a gasolene engine of the ordinary type which is designated by the reference numeral 19, the gas engine being provided with the customary radiator 20, fan 21 and similar parts. The main shaft 22 of the engine is mounted for slight horizontal shifting and is journaled at the rear in a bearing 23, illustrated in detail in Fig. 4, and carries at its rear end the friction transmission disk 25. The disk 25 is in position to engage and rotate the second transmission disk 26, which disk is splined on the transverse counter-shaft 27. At one side (the left as chosen for illustration) the shaft 27 carries a small gear 28, which engages a shrouded reducing gear 29 mounted on a shaft 30. The short shaft 30 carries a sprocket 31 on which runs a sprocket chain 32, which also runs over a sprocket 33 on a stationary shaft 34. This stationary shaft forms a means of mounting a number of sprockets, sheaves and the like operating parts; and it also forms the pintle of a hinged connection between the power unit P and the binder B and an element in the mechanism for throwing the transmission disk 25 as will later appear.

As previously stated, the binder employed in my device is of the usual commercial type, and on the drawings I have only illustrated enough of such a binder to enable me to describe the parts which I have added thereto, and to enable the description of such parts to be understood. In the drawings the reference numeral 35 designates the frame of the binder, this frame being supported in the customary manner on the bull-wheel 36 and the usual idler out at the end of the platform 37 (said idler not being shown). The reference numeral 38 is employed to indicate the cutter bar of the harvester, this cutter bar being driven by the customary connecting link 39 which derives its power through the shaft 40 and the bevel gearing 41 from the shaft 42, which also drives the other mechanism of the binder. In the usual binder the shaft 42 is driven by the sprocket chain 43, which runs on a sprocket wheel on the hub of the bull-wheel 36 and on a sprocket wheel 431 normally free on the shaft 42 but adapted to be connected thereto by the clutch 432.

To this customary construction I have added a counter-shaft 44 journaled in brackets 45, 46 mounted on the frame 35; a sprocket 47 free on the shaft 42 but rigid with the sprocket 431, a sprocket chain 48 running on sprocket 47 and on a sprocket wheel 49 on the shaft 44, a sprocket wheel 50 on the shaft 44, and a sprocket chain 51. I have also added steering and controlling means for the power unit as will later appear. The sprocket chain 51 also runs over the sprocket 52, which sprocket is journaled on the shaft 34. By referring to Fig. 6 it will be seen that the sprockets 33 and 52 are each keyed to a sleeve 53 journaled on the shaft 34 and that, therefore, these sprockets rotate together. Consequently power transmitted from the power plant to the sprocket 33 will also be transmitted through the sprockets and chains described to the counter-shaft 42, which forms a part of the customary binder construction. Inasmuch as the usual sprocket 431 on the shaft 42 in binders is adapted to be driven from the bull-wheel by the sprocket chain 43 and is only a one-way sprocket adapted to drive in what is the wrong direction for my purposes, I have also found it necessary to substitute for said sprocket one adapted to transmit power from the shaft 42 to drive the bull-wheel 36 through the medium of the chain 43 and the sprocket which is already found on the hub of the bull-wheel.

Means for steering the power unit from the driver's seat of the binder are provided as follows: Adjacent the driver's seat 54 there is provided a hand wheel 55 on a steering post 551 suitably journaled in the frame of the binder and provided at its forward end with a universal joint 56. The other end of the universal joint is connected to the shaft 57 of a drum 58. Centrally wound on the drum 58 there is a steering cable 59 having its ends attached to eyes 60, 61 adjacent the extremities of the axle 11. The cable 59 passes over idle sheaves 62, 63 rotatably mounted on the shaft 34 between collars 64, 65 (see Fig. 6) and held apart by a section of spacing tubing 66; and from the sheaves the cable runs to the drum 58 around which it is wound. It will, therefore, be evident that if the hand wheel 55 be turned to rotate the drum 58 one section of the cable will be wound on the drum and the other section will be paid out. The section which is wound on will pull its end of the axle back to turn the truck, this movement being permitted by the other section of the cable being paid out. A turn of the wheel in the opposite direction will reverse this operation.

Means for applying and shutting off the power without stopping the engine are provided as follows: As previously stated, the engine shaft 22 is capable of a slight longitudinal movement on its axis. This shaft, as shown in Fig. 4, is journaled in a bearing 23, which bearing is provided with a frame 70 supported on the cross member 71 of the frame. Within the frame or casing 70 there is mounted a bearing proper which comprises a brass 72 lined with suitable anti-friction metal 73. At the forward end of the brass 72 there is provided a collar 74 pinned to the shaft, and at the rear end of the brass there is a ring 75 with a ball race therein in which may travel balls 76 for taking up without friction the thrust exerted thereagainst by the disk 25 through a similar collar 77 which rotates with the shaft. Rigidly connected to the brass 72 there is a pin 78 which is straddled by a lever 79 pivoted at 80 and extending to the right of the machine where it is connected to a link 81. The link 81 is connected at its rear end to a crank 82 which may be oscillated in any convenient manner to throw the lever 79 and, through the connections described, to move the disk 25 into and out of engagement with the disk 26. As illustrated in the drawings, this operation may be conveniently accomplished as follows: The crank 82 is non-rotatably held on the shaft 34 by a pin 85. Also pinned to the shaft 34 there is a crank 86 to which is connected a substantially vertical link 87. The upper end of link 87 is connected to a crank 88 pinned to a shaft 89 suitably mounted in bearings provided therefor on the binder frame. An operating lever 90, located within easy reach of the driver's seat 54, provides means for rotating the shaft 34 (through the train of mechanism just described) and by rotating the shaft 34 to throw the disk 25 into and out of engagement with the disk 26.

Means for reversing and for varying the speed of transmission are provided as follows: As previously stated, the friction disk 26 is splined on the shaft 27, the disk 26 being provided with a hub 91 which carries the key and which also is provided with an annular recess 92 in which run oppositely disposed pins 93 carried by a yoke 94 formed on the end of a bell-crank lever 95 pivoted at 96 on the rear cross member 97 of the frame. To the end of the bell-crank lever opposite to that carrying the yoke there is connected a link 98 which is connected at its opposite end to a bell-crank lever 99 rotatably held on the shaft 34 between a pair of collars. A substantially vertical link 991 is connected to the bell-crank lever 99 at its lower end and its upper end to a crank 992 rigidly secured to the outer end of a shaft 993 suitably journaled in the frame of the binder and provided at its rear end with an operating handle 994 located within easy reach of the driver's seat 54. It will thus be evident that by shifting the operating lever 994, through the chain of mechanism described, the friction disk 26 may be shifted to vary its distance from the center of the disk 25, thereby varying the speed of rotation imparted to the disk 26; and that it may also be thrown beyond the center of the disk 25, thus reversing the direction of motion.

Figure 2:
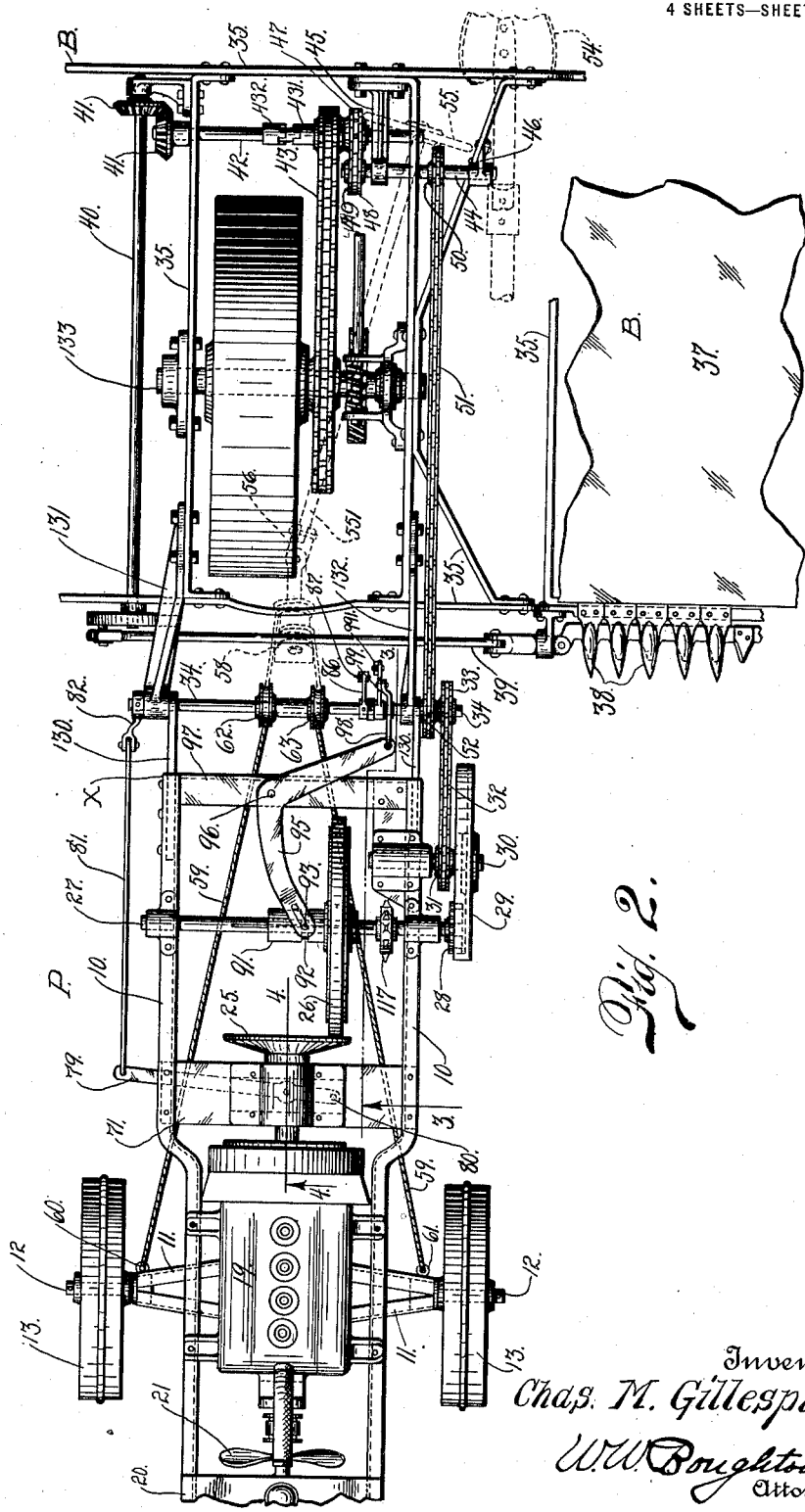
Fig. 2 is a plan view of a majority of the parts shown in Fig. 1, some of the upper parts being indicated in dotted lines only, however, and some being omitted entirely in order that the showing of the lower operating mechanism may be perfectly clear.

As previously stated, the frame proper of the power unit ends at the point marked X on Fig. 2 of the drawings. When the power unit is to be attached to a binder, short power unit frame members 130 are joined to the side members of the frame 10 by bolts or the like, these members 130 being provided with circular openings therein adapted to receive the shaft 34. Special brackets 131, 132 are also provided, which brackets are adapted to be bolted to the frame of the binder as clearly indicated in Figs. 1 and 2 of the drawings. These brackets 131, 132 are also provided with circular openings therein through which the shaft 34 is adapted to be passed. When so connected there is thus provided a hinge joint between the binder and the power unit, the pintle of which is the shaft 34. It will, therefore, be evident that the binder may be tilted as desired around its major axis 133 by operation of the usual tilting lever 134 which is provided at its forward extremity with a link 135 connected to the extension member of the power unit frame. It will also be evident that the binder frame may be moved as desired in a vertical direction by means of the customary mechanism 136, 137, 138 provided therefor. It will also be clear that the steering, controlling and power transmitting mechanism being all centered about the shaft 34 such a tilting or raising or lowering movement imparted to the binder frame can not disturb the operation of these various elements since their distance to centers remains the same in all positions.

For control of the motor I provide the same with a governor of the usual type whereby the speed of the motor may be automatically governed within prescribed limits. I also extend the circuit of the ignition back to a point convenient to the driver's seat and there insert in the circuit a switch whereby the ignition circuit may be broken at any time if it is desired to suddenly stop the operation of the motor. But these devices are of the usual type and do not form a part of my invention. Therefore, I have not deemed it necessary to illustrate the same.

While I have described my invention in detail in what is now considered by me to be its preferred form, it will be obvious that many changes and substitutions in details and specific arrangements may be made without departing from my invention, and I do not wish, therefore, to be considered as limited to the particular embodiment described further than is indicated by the appended claims.

Having thus described my invention, what I claim and desire to secure by Letters Patent is:

1. In a power unit of the character described, a frame, an engine mounted on said frame, a transporting truck on which said frame is mounted, said truck being so located that said frame and the parts which it carries are substantially balanced in a longitudinal direction thereon to adapt the assemblage for use with a similarly balanced implement, and means for transmitting power from said power unit to a separate unit to drive the latter.

2. In a power unit of the character described, a frame, an engine mounted on said frame, a transporting truck on which said frame is mounted, said truck being so located that said frame and the parts which it carries are substantially balanced in a longitudinal and transverse direction thereon to adapt the assemblage for use with a similarly balanced implement, and means for transmitting power from said power unit to a separate unit to drive the latter.

3. In a power unit of the character described, a frame, an engine mounted on said frame, a two-wheeled truck on which said frame is mounted, said truck being so located that said frame and the parts which it carries are substantially balanced in a longitudinal and transverse direction thereon to adapt the assemblage for use with a similarly balanced implement, and means for transmitting power from said power unit to a separate unit to drive the latter.

4. In a power unit of the character described, a frame, an engine mounted on said frame, a counter-shaft mounted on said frame, a clutch between said engine and said counter-shaft, a truck upon which said frame is mounted, said truck being so located that said frame and the parts which it carries are substantially balanced in a longitudinal direction thereon to adapt the assemblage for use with a similarly balanced implement, and means for transmitting power from said counter-shaft to a second machine.

5. In combination with a harvesting machine, a power unit comprising a frame, an engine mounted on said frame, a counter-shaft mounted on said frame, a clutch between said engine and said counter-shaft, a single truck upon which said frame is mounted, said truck being so located that said frame and the parts which it carries are substantially balanced in a longitudinal direction thereon to adapt the assemblage for use with a similarly balanced implement, and means for transmitting power from said counter-shaft to the traction wheel of said harvesting machine.

6. In combination with a harvesting machine, a power unit, said power unit comprising a frame, an engine mounted on said frame, a counter-shaft mounted on said frame, a clutch between said engine and said counter-shaft, a single truck upon which said frame is mounted, said truck being so located that said frame and the parts which it carries are substantially balanced in a longitudinal direction on said truck, a hinge connection between said power unit frame and the frame of said harvester, means for transmitting power from said counter-shaft to a sprocket wheel on the pintle of said hinge connection, and means for transmitting power from said last mentioned sprocket wheel to the traction wheel of said harvesting machine.

7. In combination with a harvesting machine, a power unit, said power unit comprising a frame, an engine mounted on said frame, a counter-shaft mounted on said frame, a clutch between said engine and said counter-shaft, a single truck upon which said frame is pivotally mounted, said truck being so located that said frame and the parts which it carries are substantially balanced on said truck, a hinge connection between said power unit frame and the frame of said harvester, means for transmitting power from said counter-shaft to a sprocket wheel on the pintle of said hinge connection, means for transmitting power from said last mentioned sprocket wheel to the traction wheel of said harvesting machine, a steering drum mounted on said harvester, cables running over said drum and extending to points adjacent the ends of the axle of said truck, said cables running over sheaves on the pintle of said hinge connection, and means for rotating said drum.

8. In combination with a harvesting machine, a power unit comprising a frame, an engine mounted on said frame, a counter-shaft mounted on said frame, a clutch between said engine and said counter-shaft, a single truck upon which said frame is mounted, said truck being so located that said frame and the parts which it carries are substantially balanced in a longitudinal direction thereon, a hinge connection between said power unit frame and the frame of said harvester, means for transmitting power from said counter-shaft to the traction wheel of said harvester, a lever on said power unit frame for operating said clutch, a link connection from said lever to a bell-crank lever on the pintle of said hinge connection, and operating means on the frame of said harvester for operating said bell-crank lever to throw said clutch into and out of engagement.

9. In combination with a harvesting machine, a power unit comprising a frame, an engine mounted on said frame, a counter-shaft mounted on said frame, a clutch between said engine and said counter-shaft, a single truck upon which said frame is mounted, said truck being so located that said frame and the parts which it carries are substantially balanced in a longitudinal direction thereon, a hinge connection between said power unit frame and the frame of said harvester, means for transmitting power from said counter-shaft to the traction wheel of said harvester, a lever on said power unit frame for operating said clutch, a link connection from said lever to a bell-crank lever rigidly mounted on the pintle of said hinge connection, a second bell-crank lever rigidly mounted on said pintle, a link from said last mentioned bell-crank lever to a crank, a shaft upon which said crank is rigidly mounted, and means for rotating said shaft, whereby said clutch may be thrown into and out of engagement.

10. In combination with a harvesting machine, a power unit, said power unit comprising a frame, an engine mounted on said frame, a counter-shaft mounted on said frame, a friction disk transmission between said engine and said counter-shaft, a single truck upon which said frame is mounted, said truck being so located that said frame and the parts which it carries are substantially balanced in a longitudinal direction on said truck, a hinge connection between said power unit frame and the frame of said harvester, means for transmitting power from said counter-shaft to the traction wheel of said harvester, a bell-crank lever pivoted on the frame of said power unit, one end of said bell-crank lever being connected to the transmission disk member on said counter-shaft in position to move the same axially thereon, a link connected to the other end of said bell-crank lever, a bell-crank lever mounted on the pintle of said hinge connection to which said link is also connected, and means mounted on the frame of said harvester for operating said last mentioned bell-crank lever, whereby said friction disk may be moved axially.

11. In combination with a harvesting machine, a power unit, said power unit comprising a frame, an engine mounted on said frame, a counter-shaft mounted on said frame, a clutch between said engine and said counter-shaft, a single truck upon which said frame is mounted, said truck being so located that said frame and the parts which it carries are substantially balanced in a longitudinal direction on said truck, a hinge connection between said power unit frame and the frame of said harvester, means for transmitting power from said counter-shaft to a sprocket wheel on the pintle of said hinge connection, a counter-shaft journaled in said harvester frame, means for transmitting power from said sprocket mounted on said pintle to said last mentioned counter-shaft, and means for transmitting power from said last mentioned counter-shaft to the traction wheel of said harvester and to its operating mechanism.

12. In a power unit of the character described, a frame, an engine mounted on said frame, a two-wheeled transporting truck, a socket carried by said truck, a ball carried by said frame and located substantially below the center of gravity of said frame and the parts which it carries, said ball being mounted in said socket, and means for transmitting power from said power unit to a separate unit to drive the latter.

In testimony whereof I have hereunto affixed by signature.

CHARLES M. GILLESPIE.